Figure 1A:
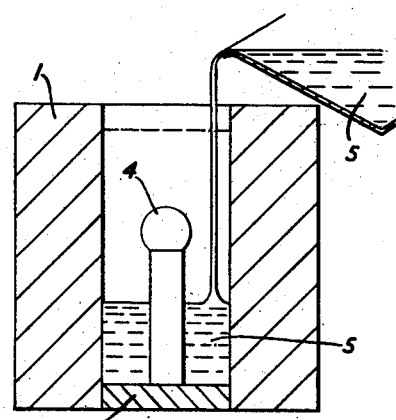
Figure 1B:
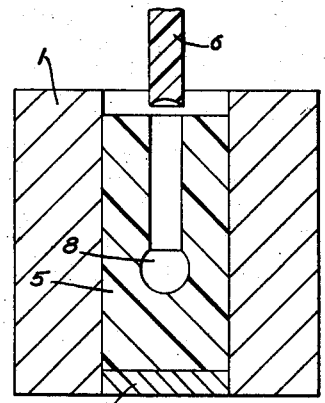
Figure 1C:
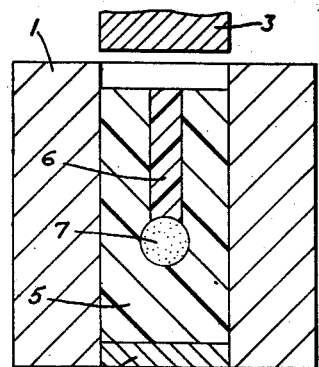
Figure 1D:
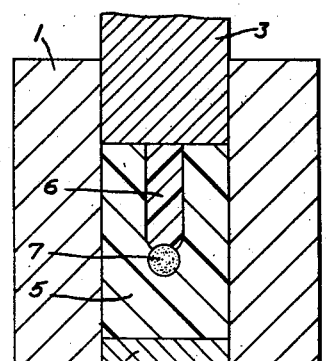
Figure 1E:
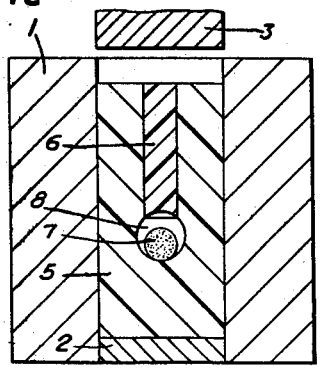

July 7, 1959     T. W. PENRICE     2,893,062
PRODUCTION OF SHAPED ARTICLES FROM POWDERS
USING LYOPHILIC GEL MOLDS
Filed June 17, 1955     3 Sheets-Sheet 1

INVENTOR
Thomas William Penrice
BY
ATTORNEYS

July 7, 1959           T. W. PENRICE           2,893,062
PRODUCTION OF SHAPED ARTICLES FROM POWDERS
USING LYOPHILIC GEL MOLDS
Filed June 17, 1955           3 Sheets-Sheet 2

INVENTOR
Thomas William Penrice

By Stevens Davis Miller & Mosher
His ATTORNEYS

July 7, 1959

T. W. PENRICE 2,893,062

PRODUCTION OF SHAPED ARTICLES FROM POWDERS
USING LYOPHILIC GEL MOLDS

Filed June 17, 1955

3 Sheets-Sheet 3

INVENTOR
Thomas William Penrice

BY Stevens, Davis, Miller, Mosher
his ATTORNEYS

United States Patent Office 2,893,062
Patented July 7, 1959

2,893,062

PRODUCTION OF SHAPED ARTICLES FROM POWDERS USING LYOPHILIC GEL MOLDS

Thomas William Penrice, Flitwick, England, assignor to Production Tool Alloy Company Limited, Sharpenhoe, England Application June 17, 1955, Serial No. 516,273

Claims priority, application Great Britain June 22, 1954

8 Claims. (Cl. 18—59.5)

This invention relates to powder metallurgy processes for shaping metal and ceramic articles by pressing refractory powders into shapes and consolidating the pressed articles by a sintering process.

The art of powder metallurgy commenced with the production of tungsten filaments. The tungsten powder was pressed into a rod under high pressure and then the pressed rod was sintered by passage of electric current through the rod to thereby form tungsten billets. The tungsten filaments were then made from such billets.

Subsequently the principles of this art were applied in many branches of industry and the limitations to the even wider application of these principles could practically all be traced to the difficulties encountered during consolidation by the sintering process because achieving uniform shrinkage of the pressed article along its surface and throughout its section during pressing or compacting of the powder was difficult.

Formerly compacting was carried out in metal dies and the pressure was applied through a plunger able to apply pressure in only one direction. Metals or ceramics in powder form do not behave as fluids, even when lubricated with binders such as paraffin wax, glycol, or polythene, and consequently when pressure is applied at the top surface of the compact there is invariably exerted a reduced pressure at the bottom surface of the compact. Thus, the bottom of the compact could not be properly compacted so that during consolidation by the sintering process the shrinkage was not uniform and was rather pronounced at the bottom of the compact thereby causing contortions and defects in the finished article.

One of the several suggestions which have been made concerning minimizing these difficulties has been to apply the pressure on more than one place. Still, when making shaped articles by so pressing a rectangular bar and subjecting it to pressure on more than one place the compacting remained uneven and still was the cause of uneven shrinkage during consolidation by sintering so that there still existed contortions and defects in the finished articles.

In the production of a long cylindrical bar by direct pressing, the pressure could only be applied at the two ends of the bar with the result that the middle was insufficiently compacted and, after consolidation by the sintering process, the resulting bar was usually thinner at the middle than at the two ends.

Another of the several suggestions which have been made concerning minimizing these difficulties has been to shape long rods or cylinders by hydrostatic pressing. During hydrostatic pressing the powder is placed in a rubber tube sealed against the ingress of the fluid and then the rubber tube containing the powder is placed in a suitable pressure vessel wherein hydrostatic pressure is applied. Practical difficulties encountered during hydrostatic pressing are how to obtain by ordinary means the high pressures required because hydraulic pumps are not generally available for very high pressures. Therefore, high pressures were sometimes applied by means of an explosion in the pressure vessel and in spite of the difficulty in controlling explosions it was found that uniform pressure could be applied on all the axes of the rods or cylinders except for a slight drag from the rubber sleeve.

A more recent development of this latter method has been the substitution of a shaped flexible mold for the rubber tube. The shaped flexible mold, like the rubber tube, is sealed against the ingress of liquid and again immersed in the liquid to which hydrostatic pressure is applied. This recently developed method while permitting making a more complicated shape to be made than was possible by the use of the rubber tube, still suffers from the limitations of the earlier method.

The ultimate aim of this invention is to permit obtaining maximum and even shrinkage during the compression of refractory powders from which metal and ceramic articles are made in order to correspondingly reduce to a minimum any shrinkage which might subsequently occur during the sintering of the pressed powders and whereby contortions or defects in the finished articles are substantially eliminated.

The invention is based on the analysis of requirements expected from the molds used to compress the refractory powders. The invention is also based on the selection of suitable materials for making the molds so that these requirements would be satisfied to thereby secure the ultimate aim of the invention. These requirements are that:

(I) The molds must be made from materials which have not only finite and stable dimensions but they must also be made from materials which are flexible and capable of sustaining deformation during the exertion of pressure for consolidating the powders whereby the molds will progressively and immediately accommodate themselves to the decreasing volume of the powders resulting from their shrinkage whereby thorough and even compacting of the powders is obtained.

(II) When the materials froms which the molds are made are subjected to compression in an enclosed space, such materials must exert substantially the same resistance to compression that a liquid would exert when it is subjected to similar compression whereby pressure applied at any one point of the mold will be distributed equally and uniformly throughout the mass of the materials from which the molds are made and evenly upon the entire surface of the powder to be pressed or compacted continuously during such pressing or compacting.

Materials which satisfy these requirements have been found to be suitable colloid systems or certain reversible elastic gels. It has been found that no critical limits can be given to define the terms "soft" and "elastic" because the softness and rapidity with which the material returns to its original shape and dimensions after release of the pressure to which it is subjected is capable of variation within very wide limits while still fulfilling all of the above requirements. It has also been found that the more easily the material is deformed under compression and the quicker it returns to its original shape and dimensions after release of the pressure, the nearer it will approximate a liquid in transmitting power without the previously mentioned disadvantages encountered when using a liquid to transmit the hydrostatic pressure, and consequently the more suitable it will be for the purpose of this invention.

It is an object of the present invention to make molds for pressing powders from suitable materials permitting that pressure be applied evenly in all directions without the disadvantages referred to above and permitting the maximum of unavoidable shrinkage to occur during pressing of the powder and before sintering the pressed powder.

It is another object of the present invention to shape metal and ceramic materials from refractory powders and before sintering by directly exerting pressure upon the surface of said powders through confined soft elastic gels whereby this pressure is transferred undiminished and uniformly over the entire surface of said powders in contact with said soft elastic gels and whereby maximum shrinkage is obtained during pressing to thereby minimize shrinkage during sintering and eliminate contortions or defects in the finished materials.

A large variety of soft elastic gels may be used. Such materials may be plasticized thermoplastic synthetic resin gels. A reversible lyophilic gel, provided it is dimensionally stable, has many advantages because it can be readily reconverted into a sol and made into the required mold shape by casting the sol and allowing it to gel and thus form a flexible mold. Among the lyophilic gels which may be used are hydrophilic gels such as gelatin, agar agar, alginic acid gels, and egg albumen. A suitable hydrophilic gel may be prepared from a 25% aqueous solution of gelatin.

Organo gels may also be used, and as will be seen hereinafter, have advantages over the hydrophilic gels. Suitble organo gels are plasticized thermoplastic synthetic resins such as polyvinyl chloride and copolymers thereof. The vinyl plastisols are particularly well adapted for the purpose of the present invention. These plastisols are dispersions in which the plasticizer is the sole dispersion medium which are obtained in well known manner by heating to temperatures of the order of 230 degrees F. the polymer in presence of the plasticiser, the gel being formed on cooling. Gels of this description are prepared and sold for the manufacture of flexible molds for casting plaster of Paris, cement, wax, and resin products.

A particularly suitable gel is prepared by highly plasticizing and gelling polyvinyl chloride.

The proportion of the dispersion medium in the sol from which the gel is prepared is adjusted to give a gel of the firmness required in the production of a mold having a sharply defined impression of the pattern used but not so firm as to lose its properties as a gel which enable it to be deformed without substantial change of volume and otherwise to behave with regard to compression as if it were a liquid. The proportion of colloid to dispersion medium is, therefore, not critical and is merely a matter of striking a balance between the strength of the gel and its flexibility so that provided the gel produced is sufficiently stable dimensionally to retain its shape when not under compression even after repeated use, the softer the gel the better it will serve the purpose of the present invention.

It is therefore a further object of the present invention to afford a method of compacting refractory powders from which metal and ceramic materials are shaped by applying pressure to said powders in a confined space and which comprises the step of interposing between the source of pressure and the surface of the powders to be compressed a soft elastic lyophilic gel.

In one form of the invention, the powder is shaped as well as compacted by placing it into the cavity of a mold made from the soft elastic gel. The mold is enclosed in a rigid die body having the shape and dimensions of the outside of the mold so that when the plunger is inserted the die body closely contains the mold. Thereafter the required pressure is applied to the die plunger.

Conveniently the mold may be made from a reversible gel such as a vinyl plastigel by pouring the liquefied gel around a pattern in a rigid die body, and removing the pattern.

As an example of the manner for carrying out the invention, the following procedure may be adopted when making a cylindrical body of tungsten carbide which is pointed at one end. A die body consisting of a steel cylinder with a plunger at each end is selected and so is an over-size cylindrical pattern of steel shaped substantially to the shape of the body of the object to be made. The steel pattern is over-size because the dimensions of all its surfaces are deliberately increased in direct proportion to the final desired dimensions of the finished object in order to compensate for the shrinkage of the powder when the latter is compressed. The steel pattern is placed in the die body and the space between the steel pattern and the wall of the die body is filled by pouring the molten lyophilic gel such as a molten highly plasticized polyvinyl chloride around the pattern. When the molten system has cooled, the steel pattern is removed leaving a cavity having an impression exactly corresponding to the size of the steel pattern. The powdered material to be compressed, namely the tungsten carbide cobalt mixture known as hard metal and containing about 1% by weight of paraffin wax is now evenly placed in the cavity so as to completely fill same. Then one of the plungers in the mold is engaged by a hydraulic ram so that pressure is applied on the lyophilic gel and through same to the powdered material. If the die body is soundly constructed pressures up to 50,000 pounds per square inch may be exerted within the die body. When the pressure is released and the plunger is removed, the powdered material will be found to be compacted uniformly or evenly so that the dimensions of the compacted material are all proportionately reduced from those of the original over-size pattern by about one quarter (20–25%).

In this example the compression of the soft elastic material or suitable colloid system has been measured and a compression of about 9% by volume has been recorded for a pressure of 10 tons per square inch. This volume contraction is generally compensated by moving one or more of the plungers of the die body along only one of the axes of the die body. Obviously this contraction is also allowed for when making the over-size pattern because otherwise a small but apparent variation of shrinkage of the powdered material being pressed would be observed. This variation would be visible by comparing dimensions of the surfaces parallel to the pressing axis relative to the dimensions of the surfaces along the other axes.

When using gelatin as the lyophilic gel for making the mold, it has been found that a 25% solution of gelatin gives a gel of suitable consistency. The following composition has been found suitable:

| | Percent by weight |
|---|---|
| Ground gelatin | 25 |
| Water | 70 |
| Glycerol | 4.75 |
| Germicide | 0.25 |

As in the case of the highly plasticized polyvinyl chloride previously described, the above formula is not critical but the gelatin to water ratio shown in the formula gives a suitable compromise between strength and flexibility of the gel. The glycerol is included in order to reduce the evaporation of water and thereby to improve the dimensional stability during storage. The germicide can be any of the well known germicides for preventing bacterial growth and acts as a preservative. Thus it will be apparent from the above that the vinyl organo gels have marked advantages over gelatin for the purpose of the invention.

It is not necessary that the material placed in the flexible mold should be in the form of powder, but the shape may have been partially compressed in a conventional die body before being placed in the mold, and thus any unevenness in the compacting will be remedied during compression in the flexible mold made according to the invention.

This is important because in the conventional method of pressing the small alteration in the shape resulting from uneven compression only becomes apparent after sintering and if the alteration is to be corrected then the hard sintered article must be ground. Yet powders pressed by conventional methods can be submitted to further pressing according to the invention and after this further pressing the alteration in the shape can be corrected in the unsintered article so that any further shrinkage occurring during sintering will be absolutely even.

For example, a cylindrical shape which has been pressed by a single plunger along one axis will be slightly in the form of a truncated cone after sintering. However, if this same pressed cylindrical shape is given a further pressing by the method of the invention before sintering and at least at the same pressure as that previously used it will be found that even shrinkage will occur during sintering so that a cylindrical shape will be obtained and the forming of the truncated cone will be avoided after the sintering stage. It has been found that the highly plasticized polyvinyl chloride acts as though it were a fluid so that pressure on one end of the die body will give uniform contraction about all other axes. Furthermore this highly plasticized polyvinyl chloride is dimensionally stable and its original shape is recovered after each pressing so that a single mold can be used repeatedly and even after this mold wears out it may be remelted and reformed into a new mold.

The invention will be further described with reference to the accompanying drawings in which, Figure 1 represents a sectional elevation of a die body consisting of a steel cylinder with plungers and there are shown at A, B, C, D, and E five stages in the making of a flexible mold according to the invention together with the pressing of the powder in the mold after the latter is made.

Figures 2A, 2B:
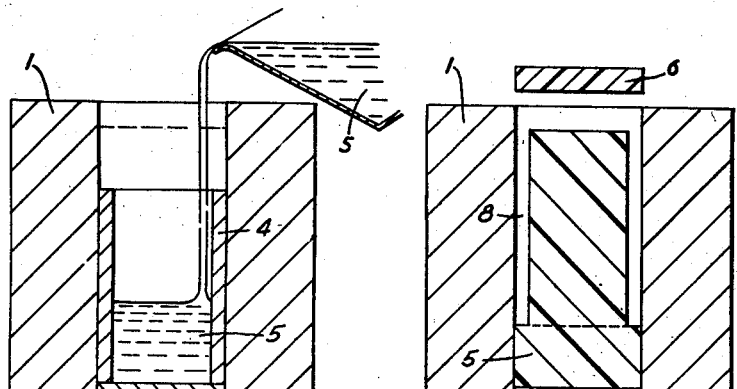
Figures 2C, 2D:
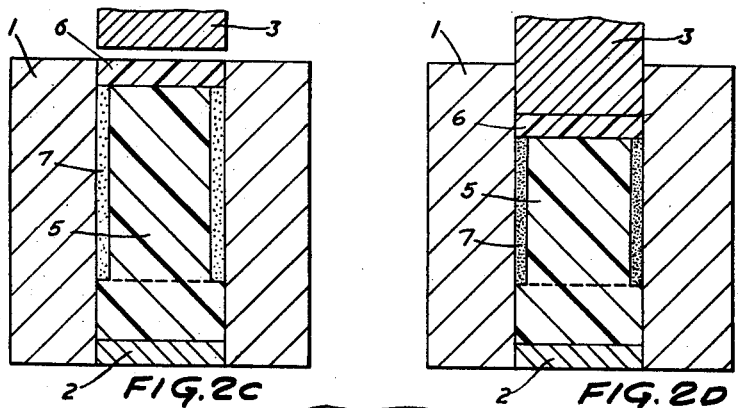
Figure 2E:
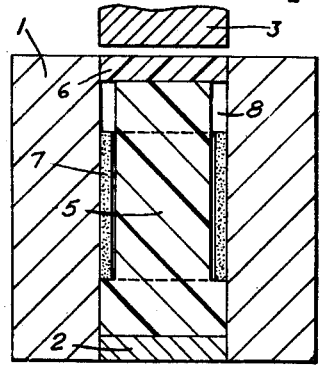
Figure 3A:
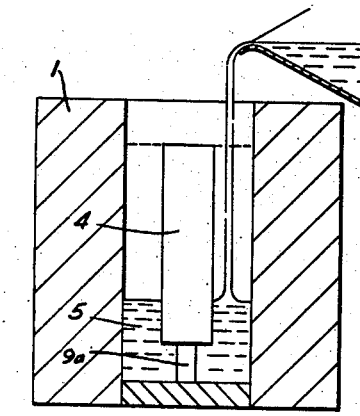
Figure 3B:
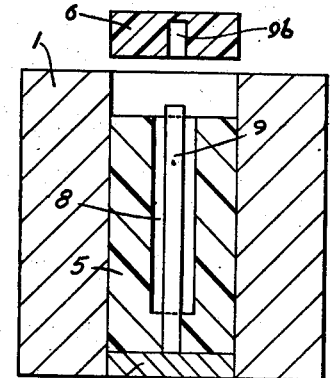
Figure 3C:
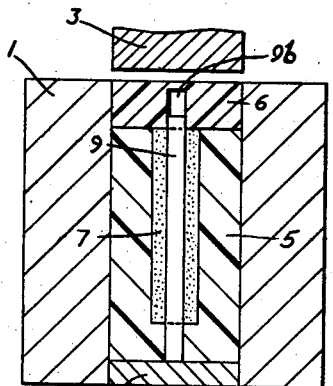
Figure 3D:
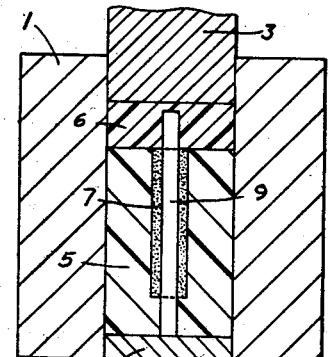
Figure 3E:
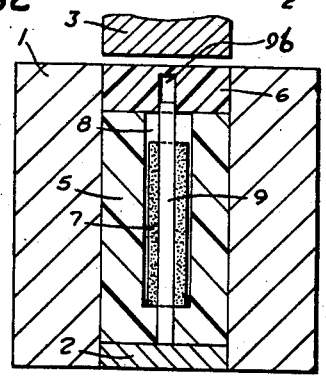

Figure 2 represents a similar die body to that shown in Figure 1 but illustrates in stages A through E the making of a different flexible mold and of a pressed article after the flexible mold is made.

Figure 3 again represents a similar die body to that shown in Figure 1 and illustrates in stages A through E the making of another flexible mold and of another pressed article after the mold is made by using a steel core.

Similar reference numerals have been used to designate like parts in all the figures of the drawings.

Now referring to Figure 1, the die body 1 is provided with a bottom plunger 2 and a top plunger 3. An oversize pattern 4 which may be of any rigid material such as steel is placed in the die body as shown in stage A. As previously set forth, the pattern 4 must be over-size by an amount directly proportional to the dimensions the powder compact will reach after pressing and to the dimensions the pressed powder compact will reach after sintering. Also compression of the reversible elastic gels, is taken into account in the making of the pattern 4 so that it is oversize. Thus shrinkage of the powder refractory materials is compensated by the over-size of the pattern 4. In this example the pattern 4 is shaped to make a spherical ball. The molten highly plasticized polyvinyl chloride is poured from a suitable vessel 5 into the mold until it reaches a level well above the spherical part, as shown by the dotted lines in stage A, and it is then allowed to cool until it sets to a firm gel.

The flexible mold thus made is then removed from the die body and inverted as shown in stage B; the pattern 4 is withdrawn; and, a highly plasticized polyvinyl chloride plug 6 is made by a separate operation, not shown. The cavity in the mold is filled by the metal powder required for pressing until the powder fills the spherical portion of the mold as shown by reference numeral 7 in stage C. The plug 6 and the plunger 3 are then placed in position as shown in stage C and a pressure of 10 tons per square inch is applied to the plunger as shown in stage D. The reversible elastic gel, in this example the highly plasticized polyvinyl chloride, acts under these circumstances as if it were a liquid so that as the powder consolidates to form the pressed article, it is deformed in shape in the same way as a liquid would be, and the pressure is communicated evenly and uniformly and continuously even during shrinkage of the powder in all directions and as shown in stage D. Under these conditions there is a contraction of 40 through 50% by volume of the space occupied by the powder. It is immaterial whether the pressure is applied on both of the plungers or whether it is applied from one direction only and against the solid support of the other plunger as between the platens of a press.

Upon release of the pressure the highly plasticized polyvinyl chloride springs back to its original shape and dimensions, leaving the pressing in the hollow space 8 provided for the spherical object but considerably smaller in volume as shown in stage E.

Now referring to Figure 2, the pattern in this example is in the form of a cylinder 4 and the highly plasticized polyvinyl chloride is poured into the center of the pattern until it reaches a position well above the top of the cylindrical pattern and as shown by the dotted lines in stage A.

After cooling and removal of the pattern, the flexible mold is inverted as shown in stage B, and the plug 6, which in this example consists only of a simple disc fitting accurately into the die body, is positioned above the die body. The annular space 8 between the flexible mold and the die body is then filled with the powder to be pressed until the level of the powder reaches the top of the flexible mold as shown at 7 in stage C whereupon the plug 6 and the plunger 3 are placed in position. Pressure is then applied as in the example illustrated in Figure 1 with respect to making the spherical ball and the pressure is effective to reduce the dimensions of the powder filled space 7, as shown in stage D. Upon releasing the pressure a cylinder of reduced wall thickness and length smaller than the space originally provided in the mold is left in space 8 as shown in stage E.

Now referring to Figure 3, a tubular mold is made by placing a pattern 4 in the die body 1. The pattern is provided with a protruding part 9a in order to form a recess in the flexible mold wherein a steel core may be inserted. The highly plasticized polyvinyl chloride is filled to the level of the top of the pattern. In this case it is not necessary to invert the flexible mold. However, on removal of the pattern, the core 9 is positioned in the recess 9a and reaches slightly above the top of the cylindrical space 8. The plug 6 in this case is also provided with a recess 9b of the same size and shape as the core and of a depth calculated to allow a space for the core when the powder 7 which fills the space 8 shrinks under pressure when the main body of the flexible mold 5 with the plug 6 in position is compressed. Upon placing the plug 6 and plunger 3 in position as shown in stage C, and applying pressure as shown in stage D, the powder in space 7 is compressed evenly from all sides into the smaller cylinder shown and upon releasing the pressure the smaller cylinder is left in space 8 as shown in stage E.

The process according to the invention may be used with all the variations known in the art, such as the insertion of mandrels or cores to produce cavities in the pressed body. Alternatively, the mandrel or core itself can be made of a compressed but unsintered powder not necessarily of the same composition as the powder to be compressed around it and in this way an article of varied composition throughout its cross-section may be produced. The pressings thus produced sinter very uniformly thereby proving that pressure has been applied evenly in all directions upon the surface of the pressings and the uniform shrinkage rates observed give further proof of this fact.

The method of compacting powders according to the present invention will be found of use wherever absolute uniformity of pressure is required in forming a pressed article from a powder, but the invention will be found of particular use in compacting powders of high melting point metals and alloys preparatory to forming sintered articles such as cutting tools from these powders.

Having thus described the invention what is claimed is:

1. The process of consolidating refractory powders into shaped articles which consists in, confining an elastic dimensionally stable substantially incompressible mold consisting of a lyophilic gel material into a die body, filling the mold with at least one of said refractory powders, and exerting pressure upon the confined mold whereby the mold will progressively and immediately accommodate itself to the decreasing volume of the powder resulting from the shrinkage of the powder to thereby obtain even and maximum compacting of the powder.

2. The process of claim 1 which consists in precompacting the powder before the mold is filled with same.

3. The process of claim 1 in which the mold is composed of a gel made from a material selected from the group consisting of polyvinyl chloride- and polyvinyl chloride copolymer-plastisols, gelatin, agar agar, alginic acid gels, and egg albumen.

4. The process of consolidating refractory powders into shaped articles to be subsequently sintered which consists in and with an elastic dimensionally stable substantially incompressible mold composed of a lyophilic gel exerting pressure upon the mold and through the mold on the surface of at least one of said powders whereby pressure applied at any one point of the mold will be distributed equally and uniformly throughout the mass of the mold and evenly upon the surface of the powder continuously while the pressure is being exerted.

5. The process of claim 4 in which the refractory powders are precompacted.

6. The process of claim 4 in which the mold is composed of a gel made from a material selected from the group consisting of polyvinyl chloride- and polyvinyl chloride copolymer-plastisols, gelatin, agar agar, alginic acid gels, and egg albumen.

7. The process of claim 1 in which the mold is composed of a polyvinyl chloride gel.

8. The process of claim 4 in which the mold is composed of a polyvinyl chloride gel.

References Cited in the file of this patent

UNITED STATES PATENTS

| | | |
|---|---|---|
| 2,027,532 | Hardy | Jan. 14, 1936 |
| 2,198,612 | Hardy | Apr. 30, 1940 |
| 2,516,091 | Renaud | July 18, 1950 |
| 2,558,823 | Crowley et al. | July 3, 1951 |
| 2,648,125 | McKenna | Aug. 11, 1953 |
| 2,708,773 | Bacon | May 24, 1955 |

FOREIGN PATENTS

| | | |
|---|---|---|
| 1,091,016 | France | Oct. 27, 1954 |